United States Patent
Dahl et al.

(10) Patent No.: US 9,920,630 B2
(45) Date of Patent: Mar. 20, 2018

(54) WIND TURBINE BLADE WITH TRANSITION REGION

(75) Inventors: Martin Dahl, Flensburg (DE); Bjarne Krab Mortensen, Billund (DK); Morten Olesen, Lunderskov (DK)

(73) Assignee: LM WP PATENT HOLDING A/S, Kolding (DK)

( * ) Notice: Subject to any disclaimer, the term of this patent is extended or adjusted under 35 U.S.C. 154(b) by 531 days.

(21) Appl. No.: 14/233,558

(22) PCT Filed: Jul. 16, 2012

(86) PCT No.: PCT/EP2012/063890
§ 371 (c)(1),
(2), (4) Date: Jan. 17, 2014

(87) PCT Pub. No.: WO2013/010979
PCT Pub. Date: Jan. 24, 2013

(65) Prior Publication Data
US 2014/0154092 A1    Jun. 5, 2014

(30) Foreign Application Priority Data

Jul. 20, 2011    (EP) .................................... 11174628

(51) Int. Cl.
*F01D 5/12*    (2006.01)
*F01D 5/14*    (2006.01)
*F03D 1/06*    (2006.01)

(52) U.S. Cl.
CPC .............. *F01D 5/147* (2013.01); *F01D 5/12* (2013.01); *F03D 1/0675* (2013.01);
(Continued)

(58) Field of Classification Search
CPC ... F01D 5/12; F01D 5/14; F01D 5/147; F01D 5/28; F01D 5/282; F03D 1/065;
(Continued)

(56) References Cited

U.S. PATENT DOCUMENTS 7,364,407 B2 *    4/2008    Grabau .................... F03D 1/065
                                                         416/229 R
7,427,189 B2 *    9/2008    Eyb .......................... F03D 1/065
                                                         416/226
(Continued)

FOREIGN PATENT DOCUMENTS

GB        2451192 B        1/2009
WO        03/078832 A1     9/2003

OTHER PUBLICATIONS

European Search Report dated Feb. 1, 2012 issued in corresponding European Application No. 11 17 4628.

*Primary Examiner* — Jason Shanske
*Assistant Examiner* — Christopher R Legendre
(74) *Attorney, Agent, or Firm* — Nath, Goldberg & Meyer; Jerald L. Meyer; Tanya E. Harkins (57) ABSTRACT

A wind turbine blade (1) is formed of a fiber-reinforced composite material comprising a polymer matrix. The blade (1) further comprises a first region (11), a second region (12) and a transition region (13) between the first and the second region (11, 12). The first region (11) is reinforced predominantly with a first reinforcement fiber material (21). The second region (12) is reinforced predominantly with a second reinforcement fiber material (22). The first and the second reinforcement fiber material differ from each other and has differing E-modulus. The transition region (13) additionally comprises a third type of reinforcement fiber material (23) differing from both the first and the second reinforcement fiber material (21; 22) and having an E-modulus between that of the first reinforcement fiber material (21) and that of the second reinforcement fiber material (22).

11 Claims, 4 Drawing Sheets

(52) U.S. Cl.
CPC ............... *F05B 2280/5001* (2013.01); *F05B 2280/6003* (2013.01); *F05B 2280/702* (2013.01); *Y02E 10/721* (2013.01)

(58) Field of Classification Search
CPC .... F03D 1/0675; F03D 3/062; F05B 2240/21; F05B 2240/221; F05B 2240/2212; F05B 2240/231; F05B 2240/30; F05B 2240/301; F05B 2240/302; F05B 2280/6003; F05B 2280/702
See application file for complete search history.

(56) References Cited

U.S. PATENT DOCUMENTS

| | | | |
|---|---|---|---|
| 7,521,105 B2* | 4/2009 | Bech | B29C 66/1162 416/229 R |
| 7,802,968 B2* | 9/2010 | Jacobsen | F03D 1/065 416/226 |
| 8,348,622 B2* | 1/2013 | Bech | B29C 66/20 416/223 R |
| 8,734,110 B2* | 5/2014 | Kuroiwa | F03D 11/0033 416/146 R |
| 2007/0189903 A1 | 8/2007 | Eyb | |
| 2014/0037455 A1* | 2/2014 | Dahl | F03D 1/0675 416/223 R |
| 2014/0154092 A1* | 6/2014 | Dahl | F03D 1/0675 416/229 R |
| 2015/0010406 A1* | 1/2015 | Torgard | B23P 15/04 416/230 |

* cited by examiner

WIND TURBINE BLADE WITH TRANSITION REGION

This is a National Phase Application filed under 35 U.S.C. 371 as a national stage of PCT/EP2012/063890, filed Jul. 16, 2012, claiming priority from European Application No. 11174628.5 filed Jul. 20, 2011, the content of each of which is hereby incorporated by reference in its entirety.

TECHNICAL FIELD

The present invention relates to a wind turbine blade having a longitudinal direction extending from a root region to a tip of the blade, said blade comprising at least one component formed of a fibre-reinforced composite material comprising a polymer matrix and a first fibre material being fibreglass and as second reinforcement fibre material being carbon fibres embedded in the polymer matrix, said blade further comprising a first region, a second region and a transition region between the first and the second region, the first region being predominantly reinforced with the first reinforcement fibre material, the second region being predominantly reinforced with the second reinforcement fibre material, the first and the second reinforcement fibre material differing from each other and having differing E-modulus.

BACKGROUND ART

Wind turbine blades are typically made from two blade shell halves of fibre-reinforced polymer. The two blade shell halves are glued together along edges of the shell halves and additionally one or more spars or webs extending in the longitudinal direction are glued to each of the shell halves to provide stiffness to the blade. It is, however, also possible to mould the blades by so-called hollow moulding, whereby the blades are made of a single shell structure only. The blades or blade halves are typically made by vacuum infusion, especially vacuum-assisted resin transfer moulding (VARTM) or by using so-called prepregs, i.e. by using fibre material pre-impregnated with resin. The fibre material is typically in the form of rovings, i.e. fibre bundles, bands of rovings or mats which may be felt mats of single fibres or woven mats of fibre rovings, whereby the mats may be unidirectional mats or multi-directional mats. The resin or polymer used is typically polyester, epoxy or vinylester. The reinforcement fibre material is typically fibreglass. However, carbon fibres are also used, as they are stiffer and have a higher E-modulus than glass fibres, and thereby provide for a higher degree of stiffness and/or a lower weight of the wind turbine blade. Additionally, it is known to use metal fibres, i.e. metal filaments in combination with glass fibres or carbon fibres.

Other types of reinforcement fibres are aramid fibres and other types of polymer fibres, natural fibres, such as hemp fibres, flax fibres and bamboo fibres may also be used for the manufacture of wind turbine blades.

WO 2006/082479 discloses a wind turbine blade and a method for preparing a wind turbine blade shell member comprising a plurality of elements of cured fibre-reinforced sheet material, such as elements of carbon fibres, glass fibres and/or wood fibres. WO 2010/006807 discloses wind turbine blade formed of a fibrous composite material including two or more different types of carbon fibres having a different E-modulus to each other and wherein the proportions of the different types of carbon fibres vary in the longitudinal direction of the blade.

WO 2003/078832 discloses a wind turbine blade of fibre-reinforced polymer including a first type of fibres, such as glass fibres, of a first stiffness and a second type of fibres, such as carbon fibres, of a different stiffness. In a transition region between the two types of fibres the quantitative ratio of the two types of fibres varies continuously in the longitudinal direction of the blade.

Unpublished European patent application No. 11161889.8 discloses a wind turbine blade as stated in the preamble to claim 1, wherein the transition region has a gradually changing proportion between the first and the second reinforcement fibre material. The first region extends in the root region of the blade and the first reinforcement fibre material is a metal.

An abrupt transition between types of fibres having differing stiffness, i.e. E-modulus, causes heavy stress concentration. Especially transitions between glass fibres and carbon fibres may cause problems, as glass fibres have an E-modulus of about 70 GPa, while the E-modulus of carbon fibres is about 230 GPa and 600 GPa or more. By providing a gradual transition between the two types of fibres, the stress concentration may be mitigated, reduced or eliminated.

In order to compensate for stress concentrations when using reinforcement fibres with differing E-moduli in composites, it is possible to provide a local thickening in the transition area between the two different fibres and thereby limit the risk of failure due to stress concentrations. One drawback of such a solution is, however, increased weight due to the increased use of fibres, e.g. glass fibres, in the transition area between glass fibres and carbon fibres.

DISCLOSURE OF THE INVENTION

It is an object of the invention of the present invention to provide a new structure of a wind turbine blade, which overcomes at least one of the disadvantages of the prior art or at least provides a useful alternative.

The object of the invention is obtained in that the transition region additionally comprises a third type of reinforcement fibre material differing from both the first and the second reinforcement fibre material and having an E-modulus between that of the first reinforcement fibre material and that of the second reinforcement fibre material. The first reinforcement fibre material is fibreglass. Typically, glass fibres have an E-modulus of about 70 GPa and a density of about 2.54 g/cm$^3$. The second reinforcement fibre material is carbon fibre. Today, carbon fibre is a preferred material for the reinforcement fibre material, as this type of fibres is used increasingly due to its low weight and high stiffness. Carbon fibres typically have a density of about 1.75 g/cm$^3$ and an E-modulus of about 230-600 GPa or more depending on the type of carbon fibre. Although WO 2003/078832 (also by the same applicant) solves the problem of the stiffness jump between carbon fibres and fibreglass, it has been found that it is necessary to have a local thickening of the blade structure in order to accommodate for a smooth transition in the stiffness of the blade. However, such thickening increases the weight of the blade and also complicates the layup procedure when moulding the blades.

The present invention alleviates this problem by means of providing the third type of reinforcement fibre material having an E-modulus between that of fibreglass and carbon fibres. Thereby, it is possible to provide a very smooth transition between the first and the second reinforcement fibre material and thereby substantially reduce or eliminate the stress concentration in the transition region between the first region comprising predominantly fibreglass and the second region comprising predominantly carbon fibres. Thus, the reduction or elimination of stress concentrations allows for a reduction in thickness and thereby of the amount of material used.

By predominantly is meant that the first, second or third reinforcement fibre material comprises at least 50, 60, 70, 80, 90, 95 or 100% by volume of the fibre-reinforced composite material in question.

The transition region may have a gradually changing proportion between the first and the second type of reinforcement fibre material. By proportion between the types of reinforcement fibre material is to be understood the quantitative ratio measured by volume.

The phrase "gradually changing" is to be understood in a broad sense and covers a monotonic change in the proportion between the types of reinforcement fibre material in question and thereby also a step-wise change, a constant change, a linear or exponential change or a change in any other manner providing a smooth transition between the types of reinforcement fibre material in question.

The change in proportion between the types of reinforcement fibre material in question may increase or decrease in the longitudinal direction of the blade.

According to an additional embodiment the third reinforcement fibre material is made of metal fibres, preferably steel fibres. Steel fibres are preferred due to their relative low costs and their E-modulus being between that of glass fibres and that of carbon fibres. Steel fibres typically have an E-modulus of about 200 GPa and a density of about 7.85 g/cm$^3$. Further, metal fibres and in particular steel fibres, have excellent compatibility with carbon fibres and fibreglass, thus lowering the possibility of e.g. delamination.

The steel fibres or steel filaments may typically have a diameter or cross-sectional dimension in the range between 0.04 mm and 1.0 mm, in the range between 0.07 mm and 0.75 mm or in the range between 0.1 mm and 0.5 mm. The filaments are monofilaments or arranged in bundles of filaments and may further be used as monofilaments or bundles of filaments or be incorporated in mats or bands of steel filaments.

According to a further embodiment the proportion between the first and the third reinforcement fibre material and the proportion between the third and the second reinforcement fibre material vary such in the longitudinal direction of the transition region that the E-modulus of the composite material varies monotonically between the first and the second region. The E-modulus of the composite material may vary monotonically decreasing or monotonically increasing. Additionally, it may vary strictly increasing or strictly decreasing. The E-modulus advantageously refers to the stiffness of the various fibre materials. The fibre-reinforcement material is advantageously arranged so as to provide a stiffness transition in the longitudinal direction of the blade. The fibres are typically arranged so as to provide stiffness to a flapwise direction of the blade.

In another embodiment the proportion between the first and the third reinforcement fibre material decreases monotonically between the first and the second region over at least a first portion of the transition region, the first portion being adjacent the first region.

In a further embodiment the proportion between the third and the second reinforcement fibre material decreases monotonically between the first and the second region over at least a second portion of the transition region, the second portion being adjacent the second region.

In an additional embodiment of the invention the proportion of the third reinforcement fibre material is essentially constant in a central portion of the transition region between the first and the second portion thereof.

The central portion of the transition region may comprise predominantly reinforcement fibre material of the third type.

According to an additional embodiment over its entire extent the transition region comprises the third type of reinforcement fibre material.

The proportion of the third type of reinforcement fibre material in the transition region may change gradually from the first to the second region. Additionally, the proportion between the first and the second type of reinforcement fibre material may decrease over the entire extent of the transition region.

According to a further embodiment the fibres or bundles of fibres of the first type of reinforcement fibres extend with differing lengths from the first region and into the transition region, fibres or bundles of fibres of the second type of reinforcement fibres extend with differing lengths from the second region and into the transition region and fibres or bundles of fibres of the third type of reinforcement fibres extend in the transition region between the first and the second type of fibres extending from the first and the second region, respectively. As a result, it is possible to provide an extremely smooth transition between the first and the second type of reinforcement fibres so that stress concentrations are eliminated or reduced substantially between the first region comprising predominantly the first type of reinforcement fibres and the second region comprising predominantly the second type of reinforcement fibres.

According to an additional embodiment the transition region is formed of a laminate of several fibre layers in which each fibre layer has a first boundary surface at a first position in the longitudinal direction and a second boundary surface at a second position in the longitudinal direction, the fibre layer including reinforcement fibres of the first type on a first side of the first boundary surface and reinforcement fibres of the second type on a second side of the first boundary surface, the fibre layer further including fibres of the third type of reinforcement fibres on a first side of the second boundary surface at the second position and reinforcement fibres of the second type on a second side of the second boundary surface, i.e. fibres of the third type of reinforcement fibres between the firs and the second boundary surface. Typically, the fibre layers comprise mats or bands of fibres. The boundary surface of each layer may be mutually displaced in order to obtain a gradual change of the proportion between the first and the second type of reinforcement fibre material and between the third and the second type of reinforcement fibre material.

According to an embodiment the transition region has a length of at least 0.3 meter, such as a length between 0.3 and 20 meters, between 0.3 and 10 meters or between 0.3 and 5 meters.

According to a further embodiment the fibres of the first region, the second region and the transition region extend predominantly in the longitudinal direction of the blade. As a result, the fibres are oriented so as to optimally withstand the loads to which the blade is subjected during use, i.e. especially bending moments, and typically to provide stiffness against flapwise deflections of the blade.

The advantages of the present invention are obtained especially in connection with load-bearing parts of the blade. The load-bearing parts inter alia include one or more longitudinally extending fibre-reinforced polymer strips in each shell half, the longitudinally extending fibre-reinforced strips include a plurality of stacked fibre-reinforced layers, such as a plurality of fibre mats, e.g. 20-40 layers or more. The longitudinally extending fibre-reinforced strips are also called main or principal laminates. Another load-bearing part or component of a wind turbine blade is a longitudinally extending spar, beam or web extending between and glued to the two shell halves of the blade.

According to an additional embodiment the at least one component is a load-bearing part of the blade, such as a spar or a beam or a principal laminate part of a shell structure of the blade.

The at least one component may be any part of the shell structure of the blade or the entire shell structure, such as a shell half of a blade comprising two shell halves glued together to form the shell structure of the blade.

The at least one component may also be a spar or a web of the wind turbine blade.

The length of the wind turbine blade may be at least 35, 40, 50, 55 or 60 meters.

BRIEF DESCRIPTION OF THE DRAWINGS

The invention is explained in detail below with reference to the drawing(s), in which.

DETAILED DESCRIPTION OF THE INVENTION

Figure 1:
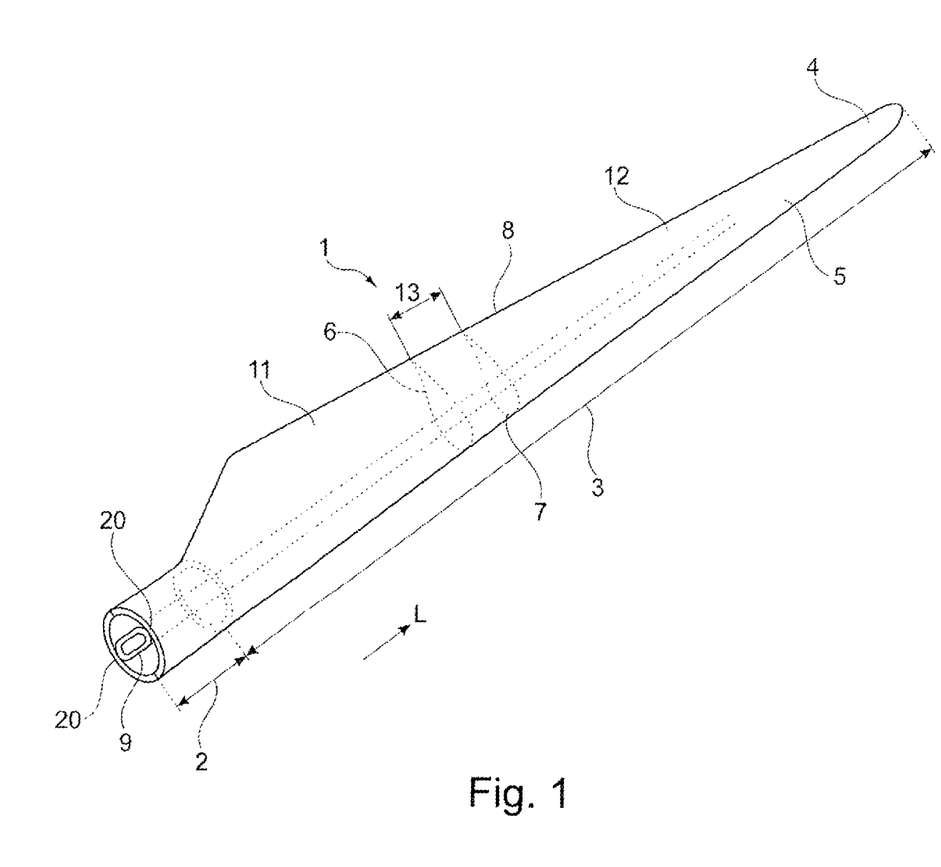
FIG. 1 is a perspective view of a wind turbine blade according to the invention.

FIG. 1 shows a blade for a conventional, modern upwind wind turbine according to the so-called Danish concept having three blades extending essentially radially from a hub. The wind turbine blade 1 comprises a root region 2 with a substantially circular profile and an airfoil region 3 with a lift-generating profile ending in a tip 4. The lift-generating profile is provided with a suction side 5 and a pressure side 6 as well as a leading edge 7 and a trailing edge 8. The wind turbine blade 1 is formed of a fibre-reinforced composite material comprising a polymer matrix and a first, a second and a third reinforcement fibre material embedded in the polymer matrix. The wind turbine blade 1 comprises a first region 11, a second region 12 and a transition region 13 between the first region and the second region. The first region 11, the second region 12 and the transition region 13 extend in the longitudinal direction L of the wind turbine blade 1. The first region 11 is reinforced predominantly with the first reinforcement fibre material, the second region 12 is reinforced predominantly with the second reinforcement fibre material, and the transition region 13 comprises the first, the second and a third reinforcement fibre material. The first reinforcement fibre material differs from the second reinforcement fibre material. The first and the second reinforcement fibre material have E-moduli differing from each other. The third type of reinforcement fibre material differs from both the first type and the second type of reinforcement fibre material and has an E-modulus between that of the first type and that of the second type of reinforcement fibre material.

The wind turbine blade 1 is manufactured by bonding two shell halves together along a bonding region substantially following a chord plane between the leading edge 7 and the trailing edge 8 of the wind turbine blade 1 such that each of the shell halves represents substantially either the pressure side 6 or the suction side 5 of the blade. The bonding region extends through the root region 2 and the airfoil region 3. Additionally, a spar or web 9 of a fibre-reinforced composite material comprising a polymer matrix and fibres is connected between the two shell halves. Finally, it should be noted that each of the shell halves also may comprise a longitudinally extending load-bearing strip, also called a main or principal laminate, especially when the blade 1 is provided with a web instead of a spar, the load-bearing strip comprising a plurality of fibre layers, such as 20 or more layers.

Figure 2:
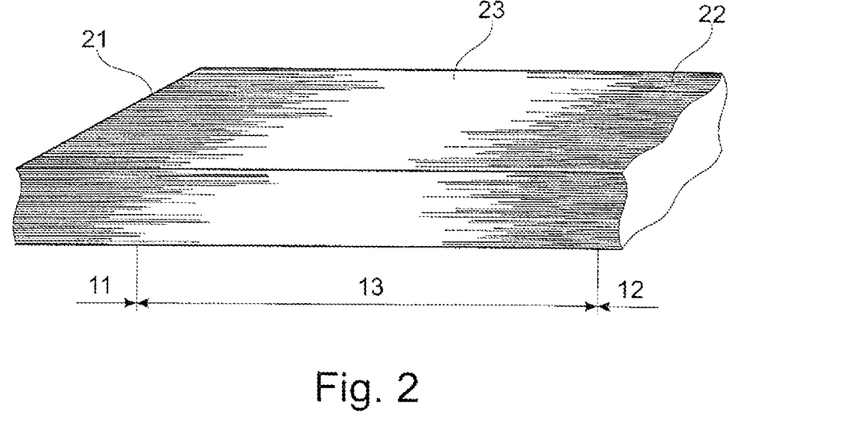
FIG. 2 is a perspective, longitudinal, sectional view of the variation of the proportion between three different types of reinforcement fibres in the area of a transition region according to a first embodiment of the invention.

The first embodiment of the invention shown in FIG. 2 is a sectional view of a wind turbine blade shell at the transition region. The first region 11 of the blade 1 is reinforced predominantly with the first reinforcement fibre material 21 if form of glass fibres, the first region 11 being shown at the left-hand side of FIG. 2. The second region 12 of the blade 1 is reinforced predominantly with the second reinforcement fibre material 22 in form of carbon fibres 23. The second region 12 is shown at the right-hand side of FIG. 2.

Fibres or bundles of fibres of the first type 21 extend with differing lengths from the first region 11 into the transition region 13. Correspondingly, fibres or bundles of fibres of the second fibre type 22 extend with differing lengths from the second region 12 into the transition region 13. Further, fibres or bundles of fibres of the third type 23 extend in the transition region 13 between the first and the second type of fibres or bundles of fibres 21, 22 extending from the first and second region 11, 12, respectively. The third type of fibres may be steel fibres, i.e. steel filaments, having an E-modulus between that of the glass fibres and carbon fibres.

In FIG. 2 the third type of fibres 23 is not visible, but it is to be understood that these fibres extend between the fibres or bundles of fibres extending from the first and second region 11, 12, respectively, so that a smooth transition between the first type of fibres 21 and the second type of fibres 22 as well as between the third type of fibres 23 and the second type of fibres 22 is obtained. In other words, by means of the transition region 13 comprising all three different types of fibres 21, 22, 23, a smooth transition is obtained between the first region 11 comprising predominantly the first type of fibres 21 and the second region 12 comprising predominantly the second type of fibres 22.

In the embodiment shown in FIGS. 1 and 2, the first region provided is an inboard longitudinal region of the blade, and the second region is provided in an outboard longitudinal region of the blade. This embodiment has the advantage that additional bending stiffness can be provided to the outboard part of the blade by using carbon fibres in order to minimise the blade deflection without having to add an excess amount of reinforcement fibres. However, according to the invention, it is recognised that the first region may also be arranged outboard and the second region be arranged inboard. Such an embodiment has the advantage with respect to lightning protection that the blade tip reinforced with glass fibres is less likely to attract a lightning strike than a blade tip reinforced by carbon fibres.

Figure 3A:
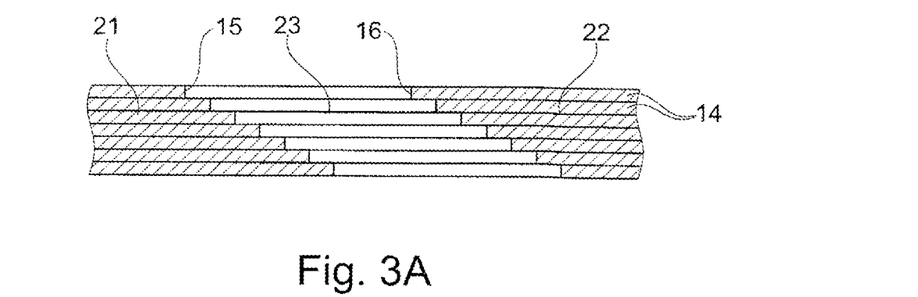
FIG. 3A is a longitudinal, sectional view through an area of the blade including the transition region according to a second embodiment of the invention.
Figure 3B:
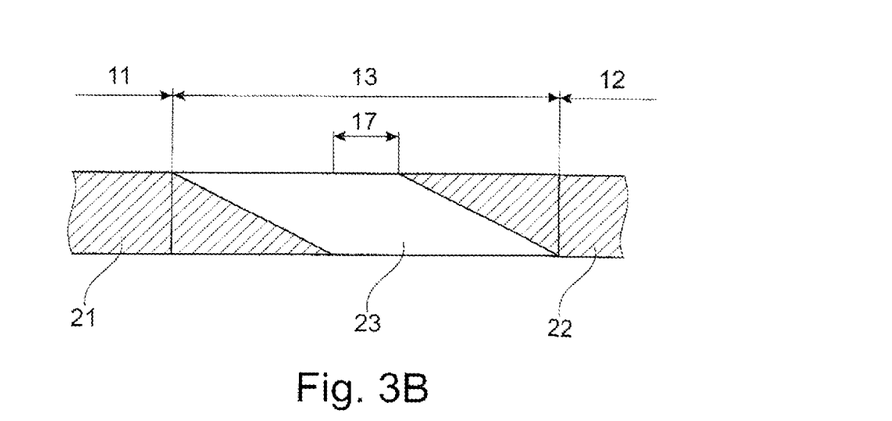
FIG. 3B shows the proportion between the three different types of reinforcement fibres for the second embodiment shown in FIG. 3A.

FIG. 3A discloses another method for obtaining a transition region 13 between a first region 11 comprising predominantly the first type of fibres 21 and the second region 12 comprising predominantly the second type of fibres 22 and wherein the transition region 13 comprises the third type of fibres 23. FIG. 3A discloses seven stacked fibre layers formed for instance of fibre mats or bands. Each fibre layer 14 has a first boundary surface 15 at a first position in the longitudinal direction and a second boundary surface 16 at a second position in the longitudinal direction. Each fibre layer 14 includes fibres of the first type 21, such as glass fibres, up to the first boundary surface 15. From the first boundary surface 15 to the second boundary surface 16 the fibre layer 14 comprises predominantly fibres of the third type 23, such as steel fibres. From the second boundary surface 16 the fibre layer 14 comprises predominantly fibres of the second type 22, such as carbon fibres. As shown in FIG. 3A, the boundary surfaces 15, 16 of the different fibre layers 14 are displaced in the longitudinal direction so that the boundary surface 15 and the boundary surface 16 in one fibre layer 14 are displaced relative to the boundary surfaces 15, 16 of the any other layer. As a result, a smooth transition is obtained between the first region 11 comprising predominantly the first type of fibres 21 and the second region comprising predominantly the second type of fibres 22, as clearly seen from FIG. 3 disclosing the proportion between the three different types of fibres.

As it appears from FIG. 3B, the proportion between the first and the third type of fibres 21; 23 decreases essentially linearly between the first region 11 and the second region 12 over a first portion of the transition region 13 adjacent the first region 11. Correspondingly, the proportion between the third and the second reinforcement fibre material 23; 22 decreases essentially linearly over a second portion of the transition region 13 adjacent the second region 12.

Further, as seen in FIG. 3B the spacing between the first boundary surface 15 and the second boundary surface 16 in each fibre layer 14 and the displacement of the boundary surfaces 15, 16 in relation to each other in the different layers 14 is such that the proportion of the third reinforcement fibre material 23 is essentially constant in a central portion 17 of the transition region 13. The central portion of the transition region 13 comprises predominantly reinforcement fibre material of the third type 23, as seen in FIG. 3B.

Figure 4A:
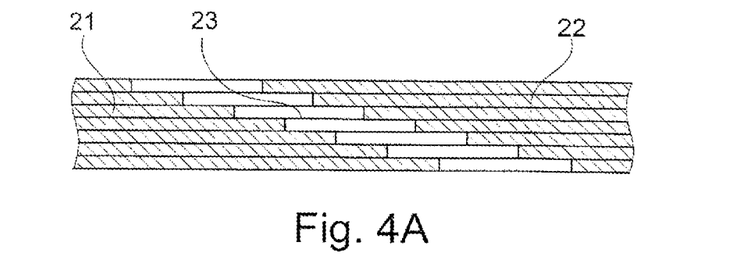
FIG. 4A is a longitudinal sectional view of the area of the blade with the transition region according to a third embodiment.

The third embodiment shown in FIG. 4A is similar to the third embodiment shown in FIG. 3A, except that spacing between the first boundary surface 15 and the second boundary surface 16 in each fibre layer 14 is smaller than the one shown in FIG. 3A and that the displacement between the boundary surfaces 15, 16 in the different layers 14 is larger than the one shown in FIG. 3A.

Figure 4B:
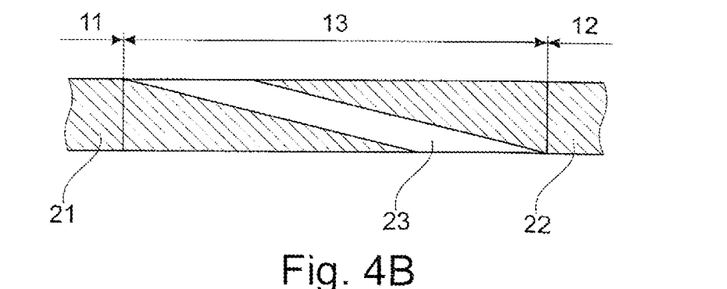
FIG. 4B shows the proportion between the three different types of reinforcement fibres in the embodiment shown in FIG. 4A.

As shown in FIG. 4B the proportion between the first type of fibres 21 and the second type of fibres 22 decreases in the transition region 13 over a first portion thereof adjacent the first region 11. Further, the proportion between the third type of fibres 23 and the second type of fibres 22 decreases over a second portion of the transition region 13 adjacent the second region 12. In a central portion 17 of the transition region 13 the proportion of the third type of fibres 23 is essentially constant. However, contrary to the embodiment shown in FIGS. 3A-3B, the embodiment shown in FIGS. 4A and 4B does not comprise a portion of the transition region comprising only the third type of fibres 23.

Figure 5A:
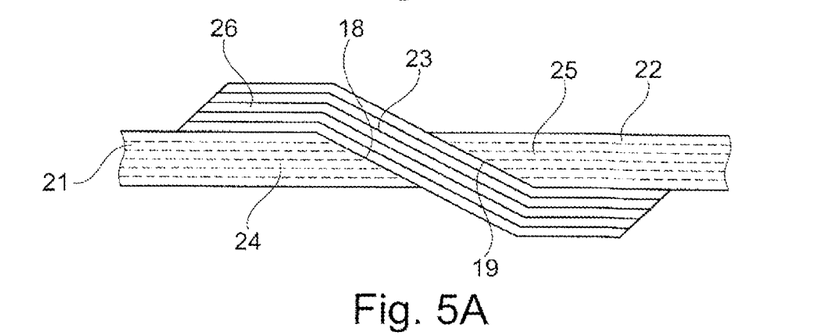
FIG. 5A is a longitudinal, sectional view through an area of the transition region of the blade according to a fourth embodiment of the invention.
Figure 5B:
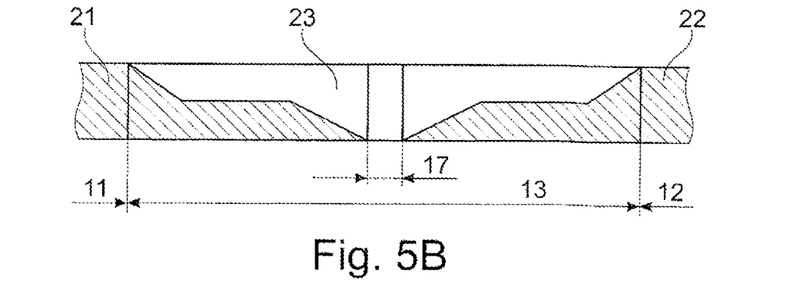
FIG. 5B shows the proportion between the three different types of reinforcement fibres in the embodiment shown in FIG. 5A.

FIG. 5A is a diagrammatic view of a fourth embodiment comprising six stacked layer 24 of predominantly the first type of fibres 21, the layers 24 being longitudinally displaced so as to provide a first chamfered boundary surface 18. The embodiment further comprises six stacked layers 25 predominantly of the second type of fibres 22, the layers being longitudinally displaced so as to provide a second chamfered boundary surface 19. Five stacked layers 26 of the third type of fibres 23 are arranged on top of the stacked layers 24 of the first type of the 21 and extend in between the first chamfered boundary surface 18 and the second chamfered boundary surface 19 and onto the lower surface of the stacked layers 25 of the second type of fibres 22. Thereby, a transition region 13 comprising all three types of fibres is provided between the first region 11 comprising predominantly the first type of fibres 21 and the second region 12 comprising predominantly the second type of fibres 22, as shown in FIG. 5B. As seen from the first region 11 towards the second region 12, the proportion between the different types of fibres is as follows: In the portion of the transition region 13 adjacent the first region 11 the proportion between the first type and the third type of fibres decreases, whereafter the proportion between the first type and the third type of fibres is constant. Then the proportion between the first type and the third type of fibres decreases once more until a central portion 17 in which the transition region 13 comprises predominantly fibres of the third type 23. After the central portion 17, the proportion between the third and the second type of fibres decreases, is thereafter constant and decreases again in the portion of the transition region 13 adjacent the second region 12. The first type of fibres 21 may be glass fibres, the second type of fibres 22 may be carbon fibres and the third type of fibres 23 may metal fibres, i.e. metal filaments. By means of the embodiment shown in FIGS. 5A and 5B a smoother transition between the first region 11 and the second region 12 is obtained.

In respect to FIG. 5A it should be noted that instead of being arranged on top of the stacked layers 24 and on the lower surface of the stacked layers 25 each of the five stacked layers 26 comprising predominantly the third type of fibres may be sandwiched between layers of the stacked layers 24 and the stacked layers 25, respectively. Thereby, the embodiment would be more easily produced.

Figure 6:
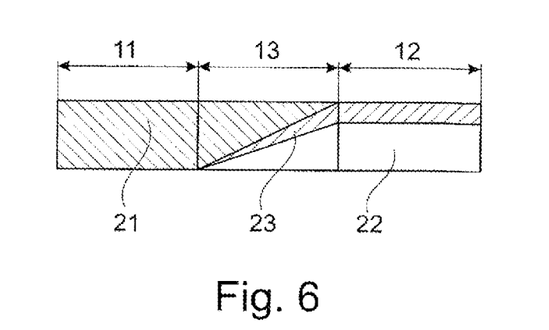
FIG. 6 shows the proportion between the three different types of reinforcement fibres in the area of the transition region of the blade according to a fifth embodiment.

FIG. 6 discloses for a fifth embodiment of the invention the variation of the three different types of fibres as seen in a longitudinal sectional view. The first region 11 comprises essentially only the first type of fibres 21, such as glass fibres. The transition region 13 comprises a gradually decreasing proportion of the first type of fibres 21 and a gradually increasing proportion of the second type of fibres 22 and additionally an increasing proportion of the third type of fibres 23. The second region 12 comprises predominantly fibres of the second type of fibres 22 and a small amount of fibres of the third type 23. As a result of the shown proportion between the different types of fibres, a smooth transition is provided between the first region 11 comprising only the first type of fibres 21 and the transition region 13 comprising a mixture of the first, the second and the third type of fibres 21, 22, 23. Further, a smooth transition is provided between the transition region 13 comprising a mixture of the first, the second and the third type of fibres 21, 22, 23 and the second region 12 comprising a mixture of the second and the third type of fibres 22, 23, the second region 12, however, comprising predominantly the second type of fibres 22. Thereby, a smooth transition is obtained between the first and the second region.

Figure 7:
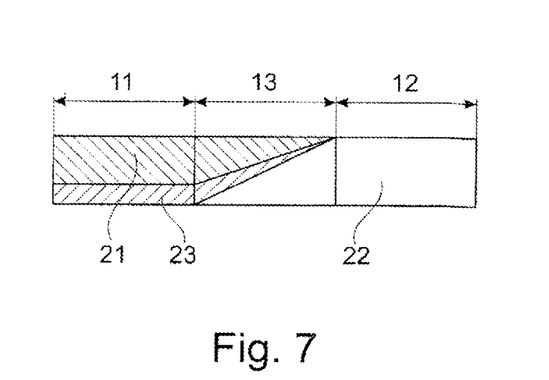
FIG. 7 shows the proportion between the three different types of reinforcement fibres in the area of the transition region of the blade according to a sixth embodiment of the invention.

FIG. 7 shows the variation of the three different types of fibres or a sixth embodiment as seen in a longitudinal sectional view. The first region 11 comprises a mixture of the first type of fibres 21 and the third type of fibres 23, but having a predominant amount of the first type of fibres 21. The transition region 13 comprises a decreasing proportion of the first type of fibres 21, a decreasing proportion of the third type of fibres 23 and an increasing proportion of the second type of fibres 22, as seen in the direction from the first region 11 towards the second region 12. The second region 12 only comprises fibres of the second type of fibres 22. As the proportion between the three different types of fibres changes gradually in the transition region 13, a smooth transition is obtained between the first region 11 comprising a mixture of the first type and the third type fibres, but predominantly the first type of fibres 21 and the second region 12 comprising only the second type of fibres 22.

In the examples illustrated in FIGS. 6 and 7 the first type of fibres 21 may be glass fibres, the second type of the fibres 22 may be carbon fibres and the third type of fibres 23 may be steel fibres, i.e. steel filaments. For all the embodiments described other types of fibres than glass fibres, carbon fibres and steel fibres may be used provided that the third type of fibres differs from the first type of fibres and has a higher E-modulus than that of the first type of fibres and that the second type of fibres differs from the third type of fibres and has a higher E-modulus than that of the third type of fibres.

LIST OF REFERENCE NUMERALS

1 Wind turbine blade
2 Root region
3 Airfoil region
4 Tip
5 Suction side
6 Pressure side
7 Leading edge
8 Trailing edge
9 Spar or web
11 First region
12 Second region
13 Transition region
14 Fibre layer
15 First boundary surface
16 Second boundary surface
17 Central portion
18 First chamfered boundary surface
19 Second chamfered boundary surface
21 First reinforcement fibre material=glass fibres
22 Second reinforcement fibre material=carbon fibres
23 Third reinforcement fibre material
24 Six stacked layers of the first type of fibres (glass fibres) 21
25 Six stacked layers of the second type of fibres (carbon fibres) 22
26 Five stacked layers of the third type of fibres 23
L Longitudinal direction

The invention claimed is:

1. A wind turbine blade (1) having a longitudinal direction (L) extending from a root region (2) to a tip (4) of the blade, said blade comprising
at least one component formed of a fiber-reinforced composite material comprising a polymer matrix and a first reinforcement fiber material (21) being fiberglass and a second reinforcement fiber material (22) being carbon fibers embedded in the polymer matrix,
said blade further comprising a first region (11), a second region (12) and a transition region (13) between the first and the second region (11, 12), the first region (11) being reinforced predominantly with the first reinforcement fiber material (21), the second region (12) being reinforced predominantly with the second reinforcement fiber material (22), the first and the second reinforcement fiber materials differing from each other and having differing E-moduli,
characterized in that the transition region (13) additionally comprises a third type of reinforcement fiber material (23) differing from both the first and the second reinforcement fiber material (21; 22) and having an E-modulus between that of the first reinforcement fiber material and that of the second reinforcement fiber material,
wherein the proportion between the first reinforcement fiber material and the third reinforcement fiber material decreases in a portion of the transition region (13) adjacent the first region (11), then remains constant, and then decreases until a central portion (17) of the transition region comprises predominantly the third reinforcement fiber material (23);
wherein the proportion between the third reinforcement fiber material and the second reinforcement fiber material decreases after the central portion, then remains constant, and then decreases in a portion of the transition region (13) adjacent the second region (12); and
wherein the central portion is longitudinal through a cross-section, or thickness, of the transition region.

2. The blade according to claim 1, wherein the third reinforcement fiber material (23) is made of metal fibers.

3. The blade according to claim 2, wherein the metal fibers are steel fibers.

4. The blade according to claim 1, wherein the transition region (13) comprises the third type of reinforcement fiber material (23) over its entire extent.

5. The blade according to claim 1, wherein the transition region (13) has a length of at least 0.3 meter.

6. The blade according to claim 5, wherein the transition region (13) has a length between 0.3 and 20 meters.

7. The blade according to claim 6, wherein the transition region (13) has a length between 0.3 and 10 meters.

8. The blade according to claim 7, wherein the transition region (13) has a length between 0.3 and 5 meters.

9. The blade according to claim 1, wherein the fibers of the first region (11), the second region (12) and the transition region (13) are oriented predominantly in the longitudinal direction (L) of the blade (1).

10. The blade according to claim 1, wherein the at least one component is a load-bearing part of the blade.

11. The blade according to claim 10, wherein the load-bearing part of the blade is a spar, a beam, or a principal laminate part of a shell structure of the blade.

\* \* \* \* \*